United States Patent [19]

Reinartz et al.

[11] 4,400,942
[45] Aug. 30, 1983

[54] METHOD OF CONNECTING A MASTER BRAKE CYLINDER TO A BRAKE BOOSTER AND THE ASSEMBLY RESULTING FROM THIS METHOD

[75] Inventors: Hans-Dieter Reinartz; Rudolf Thiel, both of Frankfurt am Main, Fed. Rep. of Germany

[73] Assignee: ITT Industries, Inc., New York, N.Y.

[21] Appl. No.: 253,416

[22] Filed: Apr. 13, 1981

[30] Foreign Application Priority Data

May 13, 1980 [DE] Fed. Rep. of Germany ....... 3018271

[51] Int. Cl.³ .......................... B60T 13/00; F15B 9/10
[52] U.S. Cl. ................................ 60/547.1; 91/369 A; 91/376 R
[58] Field of Search ............... 60/547 R; 91/369 R, 91/369 A, 369 B, 376 R; 92/98 D, 128, 165 PR; 403/274, 377; 29/511

[56] References Cited

U.S. PATENT DOCUMENTS

| | | | |
|---|---|---|---|
| 970,669 | 9/1910 | Vallone et al. | 29/511 |
| 1,797,691 | 3/1931 | Merrill | 403/274 X |
| 2,453,434 | 11/1948 | Harder | 403/375 X |
| 2,954,246 | 9/1960 | Totah et al. | 29/510 |
| 3,642,311 | 2/1972 | Edgemont | 29/510 X |
| 3,732,616 | 5/1973 | Masrrodonato et al. | 29/510 X |
| 3,848,325 | 11/1974 | Bimba | 29/510 X |
| 4,307,570 | 12/1981 | Yardley | 60/588 X |

Primary Examiner—Paul E. Maslousky
Assistant Examiner—Abram M. Bradley, IV
Attorney, Agent, or Firm—John T. O'Halloran; Alfred C. Hill

[57] ABSTRACT

In the prior art, a master brake cylinder is connected to a brake booster by a flange and nut and bolt arrangement. According to the present invention the connection can be made with a reduced number of parts and the large flange of the master cylinder can be eliminated. This is accomplished by providing the connecting end of the master cylinder with a circular groove and the adjacent end of a reinforcing tube of the booster is positioned to encompass the grooved end of the master cylinder, the reinforcing tube having protuberances formed therein to grip the circular groove.

13 Claims, 2 Drawing Figures

METHOD OF CONNECTING A MASTER BRAKE CYLINDER TO A BRAKE BOOSTER AND THE ASSEMBLY RESULTING FROM THIS METHOD

BACKGROUND OF THE INVENTION

The present invention relates to a method of connecting a master brake cylinder to a brake booster, in particular for motor vehicles, in which arrangement the brake booster has a booster casing containing a movable wall dividing the booster casing into a vacuum chamber and a working chamber, a control valve to control the pressure in the working chamber, and a reinforcing tube connecting the transverse end walls of the booster casing, the movable wall being sealed and displaceable with respect to the reinforcing tube, and the assembly resulting from this method.

Brake boosters for motor vehicles are known where an additional force is generated from the pressure difference between a vacuum and the atmospheric pressure.

These brake boosters essentially comprise a booster casing, a movable wall arranged therein, and a control valve. The booster casing features an essentially cylindrical construction, the two transverse end walls serving for attachment. By means of the transverse end wall adjacent the control valve, the brake booster is fastened at the splash wall of a motor vehicle, while the master brake cylinder is attached to the other transverse end wall of the brake booster. The movable wall divides the inside of the booster casing into a vacuum chamber and into a working chamber.

The pressure in the working chamber may reach different values dependent on the position of the brake-pedal-operated control valve. The force which is effective on the movable wall when there is a pressure difference and the pedal force via the control valve are transmitted to the master brake cylinder via a push rod axially arranged in the booster casing.

Usually, the booster casing is of sheet steel. The pressure difference between the atmospheric pressure prevailing outside the booster casing and the vacuum inside will generate forces which will lead to a deformation of the booster casing. In addition to the pressure-difference-originated forces there will be those forces that will be transmitted via the push rod during brake actuation, i.e. the brake pedal force and the boosted force generated by the brake booster. The resultant force will act on the piston of the master brake cylinder, generating a reaction force in the master brake cylinder, the reaction force is opposed to and equal to the total force applied to the push rod.

The pedal-force-originated constituent of the reaction force will proceed from the master cylinder, via the steel parts of the booster casing, to the splash wall where the brake pedal is fastened. The boosting-force-originated constituent of the reaction force will end at the booster casing. The consequence of the reaction force being transmitted to or through the booster casing will be an axial extension of the booster casing upon actuation of the brake. Thus, the master cylinder is displaced which will imply an additional lost travel of the brake pedal. Due to the transmittance ratio of the brake lever, the extension of the booster casing will be transmitted, increased by a multiple amount, on to the brake lever.

In order to prevent a deformation of the booster casing, or at least to reduce the same, upon actuation of the brake, a first copending U.S. patent application of J. Belart and F. Wienecke, Ser. No. 61,113, filed July 26, 1979, assigned to the same assignee as the present application, discloses providing a reinforcing tube in the booster casing, extending axially thereof and connected to both transverse end walls of the booster casing, with the movable wall being sealed with respect to and displaceable on the reinforcing tube. In this brake booster, the reinforcing tube has axial slots through which slots cross members are passed for the mechanical connection of the movable wall to the control valve casing.

Moreover, a second copending U.S. patent application of J. Belart, Ser. No. 141,830, filed April 21, 1980 now U.S. Pat. No. 4,347,779, assigned to the same assignee as the present application, discloses that the axial slots are disposed in that portion of the reinforcing tube which protrudes into the vacuum chamber, that the cross members are disposed on the vacuum side of the movable wall, and that a rolling diaphragm is provided as seal between the movable wall and the reinforcing tube, the rolling diaphragm sealingly covering the axial slots upon a displacement of the movable wall in the direction of the vacuum chamber.

In these suggested brake boosters, the connection of the booster to the master brake cylinder is effected by bolts which are threaded into flange elements provided at the reinforcing tube. Due to these flange elements and because of the imperativeness of a vacuum-tight connection it is necessary to produce a relatively strong reinforcing tube.

SUMMARY OF THE INVENTION

Therefore, it is an object of the present invention to provide a simple method of connecting the master brake cylinder to the brake booster which will require only a relatively light reinforcing tube, yet the connection effected between the master brake cylinder and the brake booster is vacuum-tight.

A feature of the present invention is the provision of a method of connecting a master brake cylinder to a brake booster including a booster casing, a movable wall disposed in the casing to subdivide the casing into a vacuum chamber and a working chamber, a reinforcing tube disposed in the casing extending axially between both transverse end walls of the casing, one end of the tube being fastened to one of the transverse end walls adjacent the working chamber and the other end of the tube being fastened to an end of the master cylinder adjacent the vacuum chamber the movable wall being sealed to and axially displaceable relative to the tube, and a control valve to control the pressure in the working chamber, the method comprising the steps of: sliding the end of the master cylinder into the other end of the tube; and plastically deforming the tube in an overlapping area of the tube and the master cylinder to connect the tube to the master cylinder.

Another feature of the present invention is the provision of a brake unit comprising a master brake cylinder; a brake booster including a booster casing, a movable wall disposed in the casing to subdivide the casing into a vacuum chamber and a working chamber, a reinforcing tube disposed in the casing extending axially between both transverse end walls of the casing, one end of the tube being fastened to one of the transverse end walls adjacent the working chamber, the movable wall being sealed to and axially displaceable relative to the tube and a control valve to control the pressure in the working chamber, the tube having the other end thereof overlapping an area of an adjacent end of the master cylinder and the tube is connected to the adjacent end of the master cylinder by a plastically deformed portion of the tube disposed in the overlapping area.

This method enables a very easy and quick attachment of the master brake cylinder to the brake booster. Connecting bolts are not needed and will be replaced by a force acting on the unit from all sides. This method of connection enables the use of a very thin reinforcing tube. Further, a certain compensation of manufacturing tolerances is possible between the actuating piston of the master brake cylinder and the push rod connected with the brake booster.

The plastic deformation for the connection of the master brake cylinder to the brake booster is advantageously effected by a shearing operation. However, it is also possible to have a process of bending or bulging-in substituted for this shearing or cutting operation.

According to one embodiment of the present invention, a retaining element, preferably a retaining ring, is provided which rests at a projection of the master brake cylinder casing. Thus, a safety device and a protection for the connection effected by shearing are provided in a simple manner.

According to a further embodiment of the present invention, the master brake cylinder has at least one recess, preferably an annular groove, engaged by the part of the reinforcing tube which is sheared in. In this embodiment, the relatively strong-walled casing of the master brake cylinder is used for a connection of particularly simple construction.

In another embodiment of the present invention, the reinforcing tube has a stop limiting the overlapping area, the stop preferably being an annular crimp or indentations which will facilitate assembly.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
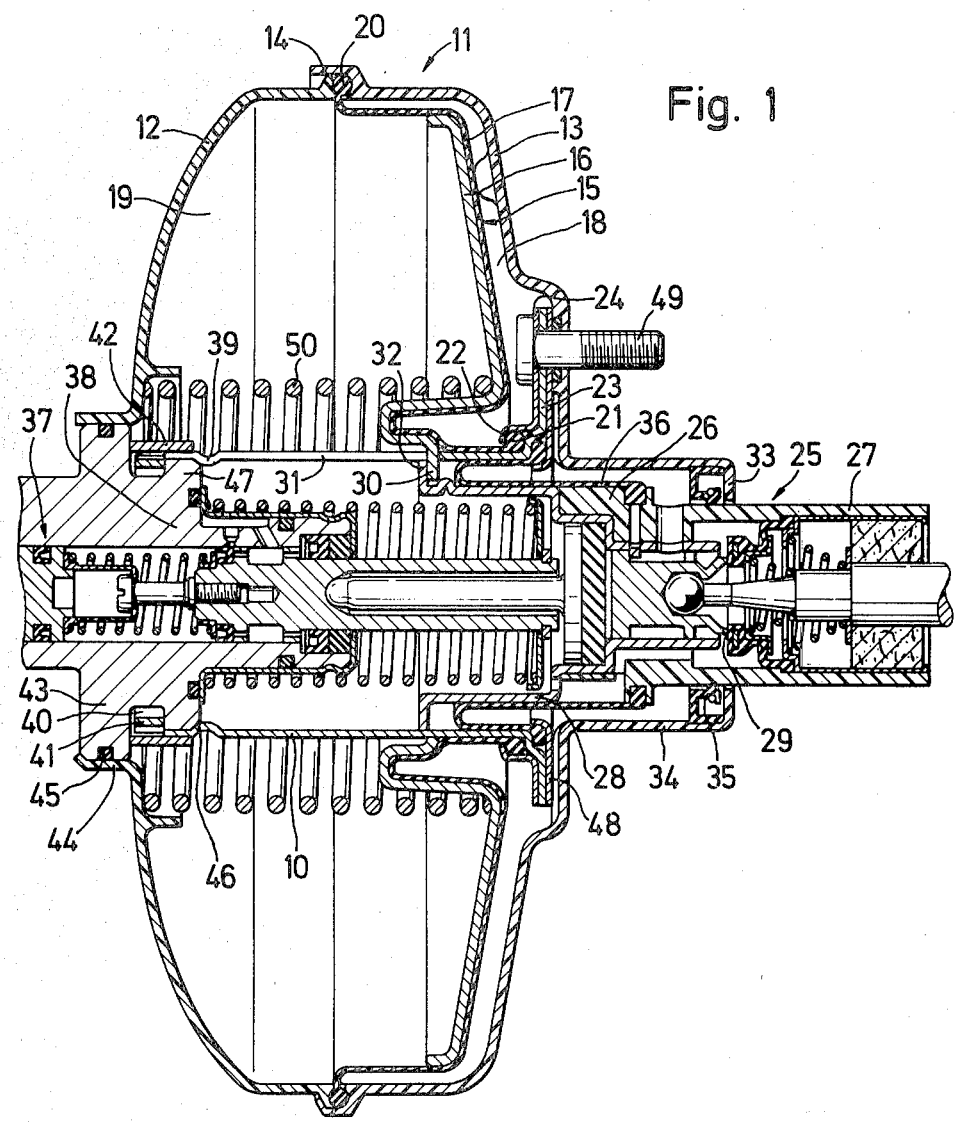
FIG. 1 is a longitudinal cross sectional view illustrating the connection of a master brake cylinder to a brake booster in accordance with the principles of the present invention.
Figure 2:
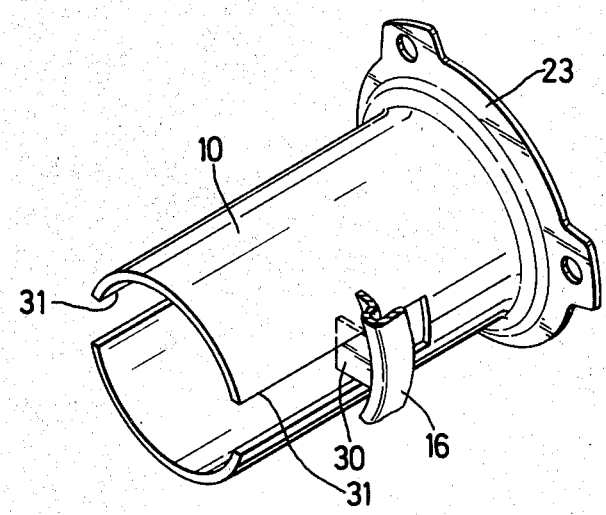
FIG. 2 is a perspective view of the reinforcing tube of FIG. 1.

The brake booster illustrated in FIG. 1 has a reinforcing tube 10 as illustrated in FIG. 2, which is the central force transmitting element. Around reinforcing tube 10 is the booster casing 11 of the brake booster. Since the reaction forces are transmitted essentially by reinforcing tube 10 it is possible to have booster casing 11 constructed of a very light-weight material. Casing 11 includes two cup-type casing parts 12 and 13 connected with each other at 14. Inside booster casing 11, a movable wall 15 is arranged which has a diaphragm plate 16 and a rolling diaphragm 17 and which subdivides booster casing 11 into a working chamber 18 and a vacuum chamber 19. Rolling diaphragm 17 has an outside bead 20 on its outside circumference and an inside bead on its inside circumference 21. Outside bead 20 is clamped at 14 between casing parts 12 and 13 while inside bead 21 is clamped at 22 between a flange 23 of reinforcing tube 10 and a clamping plate 24.

In reinforcing tube 10, a control valve 25 is disposed in an axially displaceable manner. Control valve 25 has a control valve casing 26 formed by a control valve casing hub 27 ("hub" for short) and by a control valve casing head part 28 ("head part" for short) and a poppet valve 29 arranged in hub 27.

Since movable wall 15 has to be connected with control valve casing 26 in a mechanically rigid manner, radial tongues 30 of diaphragm plate 16 extend through longitudinal slots 31 provided in reinforcing tube 10. Within reinforcing tube 10, radial tongues 30 are connected with head part 28. At head part 28, a radially extending projection 32 is formed which, on the one hand, serves for the attachment of radial tongues 30 of diaphragm plate 16 and, on the other hand, for the guidance of control valve casing 26 within reinforcing tube 10. For the purpose of attachment of radial tongues 30, tongues 30 rest at projection 32 and are clamped fast to head part 28 by means of shearing or beading. A further guidance of control valve casing 26 is provided by hub 27 which is slidably disposed in ends 33 of the neck 34 of cup-type casing part 13, ends 33 being radially bent inwardly. A seal 35 is arranged between neck 34 of cup-type casing part 13 and hub 27. A rolling diaphragm 36, on the one hand, is inserted in hub 27 which preferably is made of plastic. On the other hand, rolling diaphragm 36 is clamped between reinforcing tube 10 and a clamping plate 48.

A compression spring 50, supporting itself at casing part 12 of booster casing 11 and at diaphragm plate 16, resiliently keeps movable wall 15 in the illustrated initial position.

Threaded bolts 49 fasten flange 23 of reinforcing tube 10 together with clamping plates 24 and 48, to the transverse wall of casing part 13 of booster casing 11 and, via the latter, to the splash wall (not shown) of a motor vehicle.

The master brake cylinder 37 is directly connected to reinforcing tube 10. For the purpose of this connection, master brake cylinder 37 is slid with its casing end 38 facing the brake booster into reinforcing tube 10. The overlapping area of reinforcing tube 10 and of casing end 38 is limited by a stop 39. Stop 39 is formed in reinforcing tube 10, having the shape of an annular crimp or of indentations. For the purpose of attachment, casing end 38 of master brake cylinder 37 has at least one recess 40. In this embodiment, recess 40 has the shape of an annular groove. Recess or annular groove 40 is engaged by part 41 of reinforcing tube 10 sheared off reinforcing tube 10 for the purpose of connection with master brake cylinder 37. A retaining element 42 which, in this embodiment, has the shape of a surrounding ring is placed on top of the joint between reinforcing tube 10 and casing end 38. Retaining ring 42 rests against a surrounding projection 43 of casing end 38 of master brake cylinder 37. Projection 43 also serves for the connection of cup-type casing part 12 with master brake cylinder 37. To this end, casing part 12 has an extension 44 extending essentially in the axial direction and resting at projection 43 via a seal 45. The end of extension 44 may be bent off inwards, thus, forming a stop for the connection between cup-type casing part 12 and projection 43.

In order to effect the connection between reinforcing tube 10 and master brake cylinder 37, master brake cylinder 37 will be slid with its casing end 38 into reinforcing tube 10 until casing end 38 will come to rest with its bevelled edge 46 at stop 39. In doing so, reinforcing tube 10 will sealingly rest on the cylindrical part of casing end 38 within the covered or overlapped area. After the insertion of master brake cylinder 37 into reinforcing tube 10, there will be the shearing operation. The shearing will cause part 41 sheared from reinforcing tube 10 to be pressed into recess 40. Thus, projection 47 of casing end 38 is rigidly and immovably clamped between stop 39 and part 41 sheared from reinforcing tube 10. Then, retaining ring 42 will be slid over the joint, ring 42 resting against projection 43.

While we have described above the principles of our invention in connection with specific apparatus, it is to be clearly understood that this description is made only by way of example and not as a limitation to the scope of our invention as set forth in the objects thereof and in the accompanying claims.

We claim:
1. A brake unit comprising:
   a master brake cylinder; and
   a brake booster including a booster casing, a movable wall disposed in said casing to subdivide said casing into a vacuum chamber and a working chamber, a reinforcing tube disposed in said casing extending axially between both transverse end walls of said casing, one end of said tube being fastened to one of said transverse end walls adjacent said working chamber, said movable wall being sealed to and axially displaceable relative to said tube, and a control valve to control the pressure in said working chamber, said tube having the other end thereof overlapping an area of an adjacent end of said master cylinder, and said tube is connected to said adjacent end of said master cylinder by a plastically deformed portion of said tube disposed in said overlapping area;
   said master cylinder including an outwardly extending projection adjacent said overlapping area and said other of said transverse end walls adjacent said vacuum chamber including an axially, outwardly extending extension sealingly engaging the outer circumferential surface of said outwardly extending projection and at least a portion of a transverse wall of said outwardly extending projection remote from said overlapping area to lock said master cylinder to said booster casing.
2. A brake unit according to claim 1, wherein
   said deformed portion is a projection sheared from said tube.
3. A brake unit according to claim 2, wherein
   said adjacent end of said master cylinder includes at least one recess disposed in said overlapping area engaged by said sheared projection.
4. A brake unit according to claim 3, wherein
   said recess is an annular groove.
5. A brake unit according to claims 1, 2, 3 or 4, wherein
   said tube includes a stop defining said overlapping area.
6. A brake unit according to claim 5, wherein
   said stop is an annular crimp on the inner surface of said tube.
7. A brake unit according to claim 5, wherein
   said stop is at least one radially inwardly extending indentation in said tube.
8. A brake unit according to claim 5, further including
   a retaining element disposed to cover said deformed portion.
9. A brake unit according to claim 8, wherein
   said retaining element is a closed retaining ring.
10. A brake unit according to claim 9, wherein
    said retaining ring rests against an adjacent transverse wall of said outwardly extending projection.
11. A brake unit according to claims 1, 2, 3 or 4, further including
    a retaining element disposed to cover said deformed portion.
12. A brake unit according to claim 11, wherein
    said retaining element is a closed retaining ring.
13. A brake unit according to claim 12, wherein
    said retaining ring rests against an adjacent transverse wall of said outwardly extending projection.

* * * * *